UNITED STATES PATENT OFFICE.

AARON C. HORN, OF NEW YORK, N. Y.

FIXED-COLOR CEMENTITIOUS COMPOUND AND PROCESS OF PRODUCING THE SAME.

932,280.     Specification of Letters Patent.     Patented Aug. 24, 1909.

No Drawing.     Application filed November 6, 1908. Serial No. 461,312.

*To all whom it may concern:*

Be it known that I, AARON C. HORN, a citizen of the United States, residing at New York city, in the borough of Manhattan, county and State of New York, have invented certain new and useful Improvements in Fixed-Color Cementitious Compounds and Processes of Producing the Same, of which the following is a clear, full, and exact description.

The object of this invention is to provide a coloring matter for mortar, cement, concrete and the like, which may be readily produced, and when used, will become fixed against washout, running, staining, streaking and fading, by the action of the elements.

My invention further consists in an improved process for producing such coloring matter.

In carrying out this invention, I provide a pigment having the desired color or approximately the desired color as a base. The pigment used by me is preferably an oxid or silicate or a mixture of the two of iron or other suitable metals. I prefer to use a natural iron ore.

By the use of the ordinary iron ore or yellow ocher, I am enabled to get varying shades of red and yellow, or a combination of colors by the addition of suitable mineral pigments, for example, by adding black and yellow, certain shades of green may be obtained. To this base I add in proper proportions a fatty acid. This may be stearic, palmitic, or oleic acid, or others, but I prefer to use stearic acid, boiling said stearic acid with caustic soda dissolved in a suitable quantity of water. I prefer to add four parts of caustic soda to twenty parts of the fatty acid used. The proportions given I have found to give advantageous results when stearic acid is used. When boiled, the acid and caustic soda unite chemically, and form sodium stearate with an excess of free caustic soda. To this I add eighty parts of the pigment base. This mixture of stearate of soda, free caustic soda and iron pigment is preferably boiled and intimately mixed, and a stearate of iron produced. The water is then preferably evaporated, and as a result I secure a colored stearate of iron in approximately the color desired. This of itself has a poor value as a coloring medium, as it will not properly distribute the color through the mortar, cement or the like, in which it is to be used. In order to effect a color mixture which will have all the fast and fixed characteristics desired, and yet color the mortar or the like evenly, I find it is necessary to pursue the following step: To one part of the stearate of iron of the desired color heretofore described, I add preferably four parts of the untreated pigment of the same shade or color as was used to produce the stearate of iron, and I intimately mix the stearate of iron and the added pigment, grinding the same in water in a suitable mill. The resultant mixture will be found to be capable of use either as a powder or as a paste, or in the semi-liquid form in which it comes from the mill, and it may be added directly to the mortar, cement and the like, and mixed with the same. The mixture has a specific gravity greater than water. When mixed, it will be evenly distributed through the mass, and give to the same a uniform color. When the mortar, cement or the like has set, it will be found that the color has set in the cement or mortar and that the color will not become affected by the elements thereafter.

While I have given certain proportions which I find to give good results in actual practice, I do not limit myself to such proportions, as the same may be varied considerably without affecting the result desired to be attained.

I am well aware that it has heretofore been proposed in waterproofing cementitious compounds by the use of a lime soap such as described in the Newberry patent 851,247, April 23rd, 1907, and that a water-tight cement is described in the British patent to Liebold, 4606, 1904, and it is not my purpose to claim such waterproofing of cement. As described in this specification, and as claimed in the claims, my invention is specific to the cementitious compound, in which the coloring matter is added to a stearate of iron. It is true that a stearate of iron will secure the waterproofing effects of a lime soap, but a lime soap or a potash soap such as described in the prior patents above referred to, require a greater quantity of pigment than is required in my invention, because of the use by me of the stearate of iron. Not only is it obviously beneficial to use less coloring matter, *i. e.* iron pigment, on account of the cost of the same, but the strength both compressive and tensile, of the mortar or cement which has been colored by my compound, made according to my process, is greater than that which would be produced of the same shade or color with the compounds and processes of the prior patents. I disclaim herein all broad rights to a claim for waterproofing with color, either colored or uncolored cements by means of a soluble or insoluble soap.

I claim as my invention:

1. The herein described cementitious compound having a fixed color, consisting of a cementitious ingredient, a colored stearate of iron, and an additional amount of iron pigment.

2. The herein described cementitious compound having a fixed color, consisting of a cementitious ingredient, a colored stearate of iron, and an additional amount of iron pigment, said stearate of iron and said iron pigment being of approximately the same color.

3. The herein described cementitious compound having a fixed color, consisting of a cementitious ingredient, a colored stearate of iron, and an additional amount of iron pigment, said resultant color having a specific gravity greater than water.

4. The herein described process of producing fixed-color cement or the like, consisting of mixing fatty acid and a caustic alkali to produce a fatty acid salt of the alkali used, adding thereto an iron pigment to produce an iron salt of the fatty acid used, adding thereto additional iron pigment, and then mixing in proper proportions with cementitious material.

5. The herein described process of producing a fixed-color cement or the like, consisting of mixing caustic soda and a fatty acid to produce the sodium salt of said fatty acid, adding thereto an iron pigment to produce iron salt of the fatty acid, adding thereto iron pigment, and then mixing in proper proportions with cementitious material.

6. The herein described process of producing a fixed-color cement or the like, consisting of mixing stearic acid with a caustic alkali to produce a stearate of the alkali used, adding thereto iron pigment to produce a stearate of iron, adding thereto an additional quantity of iron pigment, and then mixing in proportions with cementitious material.

7. The herein described process of producing a fixed-color cement or the like, consisting of mixing twenty parts of stearic acid with four parts of caustic soda, adding thereto eighty parts of iron pigment to produce a stearate of iron, adding to one part of the stearate of iron four parts of iron pigment, and then mixing in proper proportions with cementitious material.

8. The herein described process of producing a fixed-color cement or the like, consisting of boiling caustic soda and stearic acid to produce a stearate of soda with free caustic soda, adding thereto an iron pigment to produce a stearate of iron, adding to the stearate of iron additional parts of the iron pigment, and then mixing in proportions with cementitious material.

Signed at New York city this 4th day of November 1908.

AARON C. HORN.

Witnesses:
J. BAXTER,
A. A. GARRIGAN.